(No Model.)
W. W. WHITE.
PNEUMATIC TIRE.
No. 590,030. Patented Sept. 14, 1897.
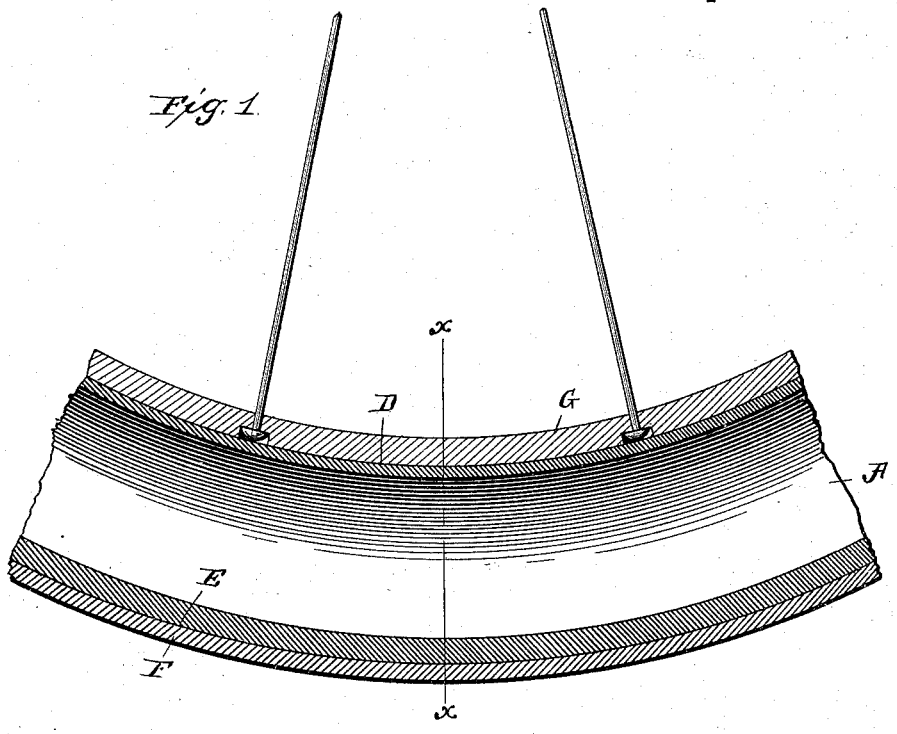
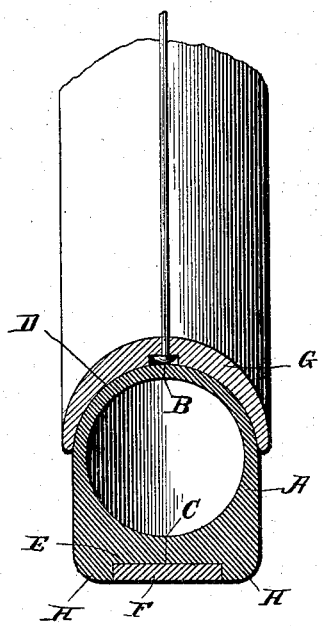
Witnesses
E. C. Wurdeman
S. S. Williamson
Inventor
William W. White
By Geo. H. Holgate
Attorney

United States Patent Office.

WILLIAM W. WHITE, OF BROOKLYN, NEW YORK.

PNEUMATIC TIRE.

SPECIFICATION forming part of Letters Patent No. 590,030, dated September 14, 1897.

Application filed December 2, 1896. Serial No. 614,222. (No model.)

*To all whom it may concern:*

Be it known that I, WILLIAM W. WHITE, a citizen of the United States, residing at Brooklyn, in the county of Kings and State of New York, have invented a certain new and useful Improvement in Pneumatic Tires, of which the following is a specification.

My invention relates to a new and useful improvement in pneumatic tires for vehicle-wheels, and especially for use in connection with bicycle-wheels, and has for its object to so construct such a tire as to preclude the possibility of its becoming punctured, and also to increase the traction between the tread of the tire and the road-bed over which it may pass in order that the liability of slipping will be decreased.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1 is a section of a portion of a tire made in accordance with my improvement and applied to the rim of a wheel, and Fig. 2 a section at the line $x$ $x$ thereof.

In carrying out my invention as here embodied I mold or otherwise form the tire A in two sections, which are united upon lines running lengthwise of said tire, as indicated at B and C. The interior of this tire is hollow and circular in cross-section, as shown in Fig. 2, while the exterior thereof is semicircular at that portion which fits within the ring, as indicated at D, while the tread thereof lies at right angles to the radius of the tire and has an annular recess or groove E formed therein, in which is fitted a band of leather or other suitable tough material F. The two sections of the tire are secured together by a suitable cement, and when placed within the rim G of the wheel there will be little or no tendency to separate these sections, and they will therefore present the appearance of a tire molded in one piece, and will be as durable as though thusly made.

In practice a tire made in accordance with my improvement will have a firmer hold upon the road-bed, and therefore less tendency to slip from beneath the rider when said road-bed is wet or icy, while the band F, being of a tough material, such as leather, will preclude the possibility of a sharp-pointed object, such as a tack, penetrating the tire sufficient to puncture the same. The leather band F, being flexible, will permit the tire to adapt itself to the unevenness of the road-bed as readily as though it were not applied thereto, thus gaining all advantages of the ordinary pneumatic tire without the disadvantage of the continual liability to puncture, which often renders the machine useless, and under some conditions occasions great annoyance in conveying the machine to a locality where it may be repaired.

The shoulders H, which are approximately flush with the outer surface of the band F, increase the thickness of the tire at these points to such an extent that a sharp-pointed object is not likely to reach the interior of the tire, and the fact that these shoulders are upon the sides of the tire renders it further unlikely that a tack or other object penetrating the same would pass directly to the interior of the tire, since these shoulders would tend to spring outward when pressure was brought to bear thereon.

One of the advantages of my improvement is that the cost of a tire so built would be less than that of the ordinary pneumatic tire, while its durability would be greatly increased and its value enhanced.

Having thus fully described my invention, what I claim as new and useful is—

A pneumatic tire formed in two sections which are united upon a line running vertically through the tire, the interior of said tire being hollow and circular, the exterior being semicircular, the circular portion fitting next to the rim and the flat portion forming the tread of the tire, a flat piece of tough fibrous material placed around in a groove formed in the tread-surface, so that said material lies flush with the outside portion of the tread, substantially, as and for the purpose described.

In testimony whereof I have hereunto affixed my signature in the presence of two subscribing witnesses.

WILLIAM W. WHITE.

Witnesses:
S. S. WILLIAMSON,
R. M. PIERCE.